(12) United States Patent
Minematsu (10) Patent No.: US 6,700,993 B1
(45) Date of Patent: Mar. 2, 2004

(54) SYSTEM AND METHOD FOR ON-LINE DIGITAL WATERMARK DETECTION

(75) Inventor: Kazuhiko Minematsu, Tokyo (JP)

(73) Assignee: NEC Corporation, Tokyo (JP)

( * ) Notice: Subject to any disclaimer, the term of this patent is extended or adjusted under 35 U.S.C. 154(b) by 602 days.

(21) Appl. No.: 09/656,169

(22) Filed: Sep. 6, 2000

(30) Foreign Application Priority Data

Sep. 7, 1999 (JP) ............................................ 11-253522

(51) Int. Cl.⁷ ................................................ G06K 9/00
(52) U.S. Cl. ...................................... 382/100; 380/201
(58) Field of Search ................................ 382/100, 246, 382/251, 253, 238, 244, 236, 239; 713/150, 176; 358/3.28; 380/54, 55, 56, 226, 200, 201, 203, 241

(56) References Cited

U.S. PATENT DOCUMENTS

| | | | | |
|---|---|---|---|---|
| 5,530,759 A | * | 6/1996 | Braudaway et al. | 380/54 |
| 5,646,997 A | * | 7/1997 | Barton | 713/176 |
| 5,664,018 A | * | 9/1997 | Leighton | 380/54 |
| 5,734,752 A | * | 3/1998 | Knox | 358/3.28 |
| 5,930,369 A | * | 7/1999 | Cox et al. | 380/54 |
| 6,167,513 A | * | 12/2000 | Inoue et al. | 713/150 |
| 6,504,941 B2 | * | 1/2003 | Wong | 382/100 |

FOREIGN PATENT DOCUMENTS

JP           9-191394           7/1997

OTHER PUBLICATIONS

Cox et al.; "Secure Spread Spectrum Watermarking for Multimedia"; Transactions on Image Processing; vol. 6, No. 12; Dec. 1997; pp. 1673–1687.

Smith et al.; "Modulation and Information Hiding In Images"; First Workshop on Information Hiding, Lecture Notes in Computer Science; vol. 1174; Jul. 1996; pp. 207–226.

Matsui et al.; "An Application System for Watermark Techniques: A Protocol for Detecting Illicit Copy Images Using User's Browsing Operation"; Encryption and Information Security Symposium, 10.2.C; Jan. 1998; 6 Sheets.

Yoshiura et al.; "Secure Watermarking System Using Public Key Cryptography"; The Institute of Electronics, Information and Communication Engineers, conference of Foundation and Boundary, SA–7–7; Sep. 1997; 1 Sheet.

Yamaguchi et al.; "Digital Watermarks Using Error–Correcting Coding For Open Algorithm"; Cryptograph and Information Security Symposium; Jan. 1999; pp. 713–718.

Okamoto et al.; "A New Public–Key Cryptosystem as Secure as Factoring"; EuroCrypt '98, Lecture Notes in Computer Science 1403; 1998; pp. 308–318.

* cited by examiner

*Primary Examiner*—Jayanti K. Patel
*Assistant Examiner*—Seyed Azarian
(74) *Attorney, Agent, or Firm*—Foley & Lardner

(57) ABSTRACT

To improve a reliability of watermark detection, by making it difficult for a user to falsify watermarked image. User terminal extracts the embedded watermark by using an extraction key generated by a detection center, and encrypts it by an encryption key generated by the detection center. The user terminal also encrypts by using the encryption key authentication information which is prescribed. Then, the user terminal outputs toward the detection center a first information which is a random combination of the encrypted watermark and the encrypted authentication information. The first information is decoded and quantized by the detection center. Then, the detection center transmits a second information namely the quantized first information toward the user terminal. Finally, the user terminal authenticates the watermark on the basis of the second information.

16 Claims, 3 Drawing Sheets

FIG. 3

SYSTEM AND METHOD FOR ON-LINE DIGITAL WATERMARK DETECTION

BACKGROUND OF THE INVENTION

1. Technical Field of the Invention

The present invention relates to a digital watermark detection technique. In particular, the present invention relates to a system, method and computer program product for an on-line digital watermark detection, wherein a user terminal authenticates watermark information such as copy protect embedded in images, by using a key generated by a detection center for extracting and encrypting the embedded information and an authentication key generated by the detection center.

2. Description of the Prior Art

As digital media containing images or video images become popular, there arises a need for such a system wherein information identifying an author of a medium is added to the medium and the information is read out as occasion demands.

For example, information concerning permission of duplication is added to a media and a medium playback device is provided with a function of reading and writing this information to prevent illegal duplications.

If in this case the information concerning the permission of duplication is inseparable from the medium itself, the illegal duplications become possible by falsifying the information.

Therefore, the information added to the images must be inseparable from the images.

As one of techniques for solving this problem, there is a digital watermark technique. For example, a digital watermark technique for a still picture" is a technique for obtaining a watermarked image with some additional information embedded therein by adding an alteration of such a degree as not to be recognized by human vision to an original image transformed to digital data.

By digital watermark embedding, information is embedded in the image itself without greatly hampering the appearance.

There is an example proposed by Ingemar Cox et al. disclosed in JP9-191394 A (1997) and a paper "Secure spread spectrum watermarking for multimedia," IEEE TRANSACTIONS ON IMAGE PROCESSING, vol. 6, No. 12, December, 1997.

In this scheme, an original image is transformed to data (spectra) of the signal domain by using Fourier transform and discrete cosine transform, and noise generated by a pseudo random number is added to a portion considered to be visually important in the spectra in order to embed information.

Furthermore, in Reference 1 by J. R. Smith et al., "Modulation and information hiding in images," First workshop on information hiding, Lecture notes in computer science vol. 1174, July 1996, there is shown such a model that digital watermark embedding and detection are grasped as modulation and demodulation in communication.

Many digital watermark schemes currently proposed can be described by this model or a simple modification of this model. Hereafter, the outline of the model will be described.

By the way, in digital watermark schemes, there are schemes using the original image in detection and schemes which do not use the original image in detection.

A system in the present invention is intended for the latter cited schemes. Hereafter, therefore, the system of the present invention will be described as to the digital watermark scheme conducting detection which does not require the original image.

It is now assumed that information V is to be embedded in an image S, in the digital watermark scheme using detection which does not require the original image.

In this case, for data f(S) obtained by transforming S, a watermarked image S' satisfying the relation f(S')=W'×V is generated. As examples of the data f(S), data or a part of data subjected to signal transform such as DCT or Fourier transform, and various statistics such as the moment of the image are considered.

Here, data f(S) is referred to as feature quantity of S. In the case where detection is conducted from the watermarked image S', W×f(S') is derived. However, it is necessary that column vectors of W' are orthogonal. W' is an inverse matrix of W. In the case where embedded information is V, it is shown by (Equation 1) that the embedded information V is obtained by detection.

$$W \times f(S') = W \times W' \times V = V \quad \text{(Equation 1)}$$

W' is a modulation matrix, and W is a demodulation matrix.

For example, in the case where some editing is being conducted for the watermarked image S', the (Equation 1) is not valid, but it is considered that an Euclidean distance between the embedded information V and W×f(S') becomes shorter depending upon the degree of editing.

In this case, V is obtained by quantizing W×f(S'). In the case where one bit of the embedded information is 1 or −1, quantization q(X) of a vector X=(x1, ..., xn) is represented by the following (Equation 2).

$$q(X) = (x'1, x'2, \ldots, x'm) \quad \text{(Equation 2)}$$

x'i=1 if xi is positive
x'i=−1 otherwise

For executing detection in the digital watermark scheme coming under this model, it is sufficient to know the transform f( ) and the matrix W.

In other words, f( ) and W can be regarded as a key required to detect the digital watermark. In this case, a person who knows f( ) and W can find which portion of the signal domain of the original image is altered to embed the information.

Therefore, it is possible to falsify the watermarked image. Herein, however, falsifying means to alter a watermarked image so that an originally embedded information will not be detected or information different from the originally embedded information will be detected, without greatly degrading the picture quality of the watermarked image.

In a system using a digital watermark, there is demanded sometimes a condition that every user of a digital watermark can know the embedded information.

Hereafter, two approaches considered to satisfy the above described condition will be described.

First, as an example of a first approach, there is a paper written by Matsui et al., "An Application system for Watermark techniques: A protocol for detecting illicit copy images using user's browsing operation", Encryption and information security symposium, 10, 2. C, January 1998.

In a system proposed by this paper, a digital watermark detection program is distributed to users beforehand, and a user singly executes detection by using this program in order to obtain embedded information.

In the system of Matsui et al., key information required for detection is included in the detection program. In the case where a user has known key information required for detection, the user can perform falsification.

Therefore, supposition that users cannot know key information from the detection program becomes necessary. The fact that a program is secure against analyses conducted by malicious users is represented by an expression that the program has tamper resistance.

As the other approach, there is such a system that a reliable center executes the detection and notifies a user of only a detection result. As its example, there can be mentioned a paper written by Yoshiura et al. "Secure Watermarking System using Public key Cryptography", The Institute of Electronics, Information and Communication Engineers, Conference of Foundation and Boundary, SA-7-7, September 1997. Even if a center which executes the detection answers an illegal detection result to a user, the user cannot gain an insight, in the system of Yoshiura et al. Therefore, to what extent the center executing the detection is reliable becomes important. Furthermore, in the system of Yoshiura et al., it is conceivable that a user executes a part of detection processing such as the transform to the signal domain. In this case as well, it can be said that the possibility of success of falsification is increased by the user analyzing software possessed by the user.

In systems according to the above described two approaches in which anyone of users of a watermarked image can know embedded information, the security against falsification and reliability of the system can be said to be influenced by physical factors such as the tamper resistance of the detection program and the reliability of the center which executes the detection. For solving this problem, it is important to develop such a digital watermark technique that falsification of the embedded information is difficult even if key information required for detection is opened to users. As a concrete system in recent years, there is a paper written by Iwamura et al., "Digital Watermarks using Error-Correcting Coding for Open Algorithm", Cryptograph and information security symposium, January 1999. In the scheme of Iwamura et al., however, there is a problem that a key is needed for each of watermarked images.

In the above described conventional system in which a user can know embedded information of a watermarked image, it is assumed that a center intervenes and conducts detection processing. As a problem in this case, there can be mentioned the fact that the user cannot determine whether an answer of the center is illegal. Furthermore, in the case where a part of detection processing is conducted by a user and the remaining part is conducted by the center, it also poses a problem that software possessed by the user is required to have tamper resistance.

SUMMARY OF THE INVENTION

An object of the present invention is to provide a digital watermark detection system in which the user reveives an illegal detection result from a center which executes detection, and it is difficult for a user to falsify an watermarked image even if the tamper resistance is not supposed for a program possessed by the user.

The on-line digital watermark detection system of the present invention is characterized in that the on-line digital watermark detection system includes a user terminal device for encrypting embedded information (watermark) extracted from an input image and authentication information generated beforehand, outputting the embedded information (watermark) and the authentication information thus encrypted, as first transmission information, conducting authentication of second transmission information upon receiving the second transmission information, and extracting and outputting the embedded information decoded from the second transmission information, and a detection center device for decoding the first transmission information upon receiving the first transmission information, and outputting the first transmission information thus decoded, as the second transmission information.

Concretely, the watermark detection system of the present invention may be characterized in that the on-line digital watermark detection system includes a detection center device and a user terminal device, the detection center device includes: demodulation matrix generation means for generating a demodulation matrix required to extract embedded information; extraction and encryption key generation means for transmitting an extraction and encryption key required to extract and encrypt the embedded information to a user terminal device; second transmission information generation means for decoding first transmission information (first information) transmitted by the user terminal device and transmitting the decoded first transmission information to the user terminal device as second transmission information; and authentication key generation means for transmitting an authentication key to the user terminal device, and the user terminal device includes: image input means for inputting an image; feature quantity extraction means for calculating a feature quantity from the image; embedded information extraction and encryption means for extracting embedded information from the feature quantity and encrypting the embedded information by using the extraction and encryption key transmitted by the detection center device; authentication information generation means for generating authentication information required to authenticate the second transmission information; authentication information encryption means for encrypting the authentication information by using the extraction and encryption key; first transmission information generation means for generating the first transmission information and a generation key by using the encrypted authentication information output from the authentication information encryption means and the encrypted embedded information output from the embedded information extraction and encryption means, and transmitting the first transmission information to the detection center device; authentication means for receiving the second transmission information and the authentication key from the detection center device, and authenticating the second transmission information by using the authentication key, the generation key, and the authentication information output from the authentication information generation means; embedded information extraction means for extracting the embedded information from the second transmission information and the generation key; and authentication and embedded information extraction result display means for displaying an authentication result output from the authentication means and the embedded information extraction result output from the embedded information extraction means.

Further, the watermark detection system of the present invention may also characterized in that the on-line digital watermark detection system includes a detection center device and a user terminal device, the detection center device includes: demodulation matrix generation means for generating a demodulation matrix required to extract embedded information; extraction and encryption key generation means for transmitting an extraction and encryption key required to extract and encrypt the embedded information to a user terminal device; second transmission information generation means for decoding first transmission information transmitted by the user terminal device and transmitting the decoded first transmission information to the user terminal device as second transmission information; and authentication key generation means for transmitting an authentication key to the user terminal device, and the user terminal device includes: image input means for inputting an image; feature quantity extraction means for calculating a feature quantity from the image; embedded information extraction and encryption means for extracting embedded information from the feature quantity and encrypting the embedded information by using the extraction and encryption key transmitted by the detection center device; authentication information generation means for generating authentication information required to authenticate the second transmission information; authentication information encryption means for encrypting the authentication information by using the authentication key; first transmission information generation means for generating the first transmission information and a generation key by using the encrypted authentication information output from the authentication information encryption means and the encrypted embedded information output from the embedded information extraction and encryption means, and transmitting the first transmission information to the detection center device; authentication means for receiving the second transmission information from the detection center device, and authenticating the second transmission information by using the generation key and the authentication information output from the authentication information generation means; embedded information extraction means for extracting the embedded information from the second transmission information and the generation key; and authentication and embedded information extraction result display means for displaying an authentication result output from the authentication means and the embedded information extraction result output from the embedded information extraction means.

The on-line digital watermark detection method of the present invention is characterized in that the user terminal section encrypts embedded information extracted from an input image and authentication information generated beforehand, and outputs the embedded information and the authentication information thus encrypted, as first transmission information; the detection center section decodes the first transmission information upon receiving the first transmission information, and outputs the first transmission information thus decoded, as second transmission information; and the user terminal section conducts authentication of second transmission information upon receiving the second transmission information, and extracting and outputting the embedded information decoded from the second transmission information.

The computer program product of the present invention such as, a recording medium is characterized in that the recording medium stores an on-line digital watermark detection program recorded thereon.

PREFERRED EMBODIMENT OF THE INVENTION

Figure 1:
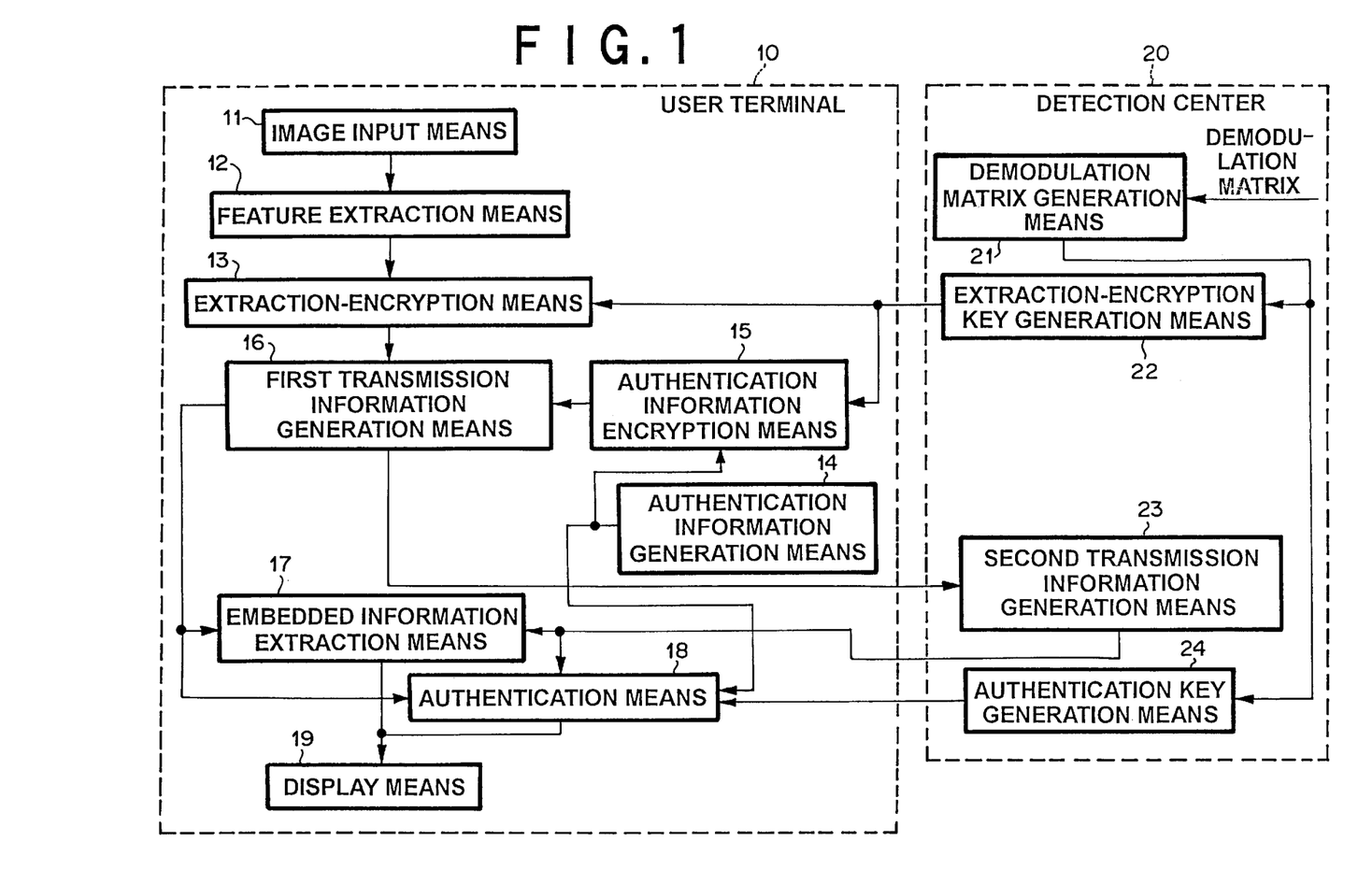
FIG. 1 is a block diagram showing a first embodiment of the present invention.

FIG. 1 is a block diagram showing a first embodiment of the present invention.

With reference to FIG. 1, The digital watermark detection system according to the present invention includes a user terminal 10 and a detection center 20.

The detection center 20 includes: demodulation matrix generation means 21 for generating a demodulation matrix required to extract embedded information (watermark); extraction-encryption key generation means 22 for transmitting an extraction-encryption key required to extract and encrypt the embedded information to the user terminal 10; second transmission information generation means 23 for generating second transmission information from first transmission information transmitted by the user terminal section 10 and transmitting the second transmission information to the user terminal 10; and authentication key generation means 24 for transmitting an authentication key required for the user terminal 10 to authenticate the second transmission information to the user terminal section.

The user terminal 10 includes: image input means 11 for inputting an image; feature quantity extraction means 12 for calculating a feature quantity of the image; embedded information extraction-encryption means 13 for extracting embedded information (watermark) from the feature quantity and encrypting the embedded information by using the extraction-encryption key generated by the detection center 20; authentication information generation means 14 for generating authentication information required to authenticate the second transmission information; authentication information encryption means 15 for encrypting the authentication information by using the extraction-encryption key generated by the extraction-encryption key generation means 22 in the detection center 20; first transmission information generation means 16 for generating the first transmission information and a generation key by using the encrypted authentication information output from the authentication information encryption means 15 and the encrypted embedded information outputted from the embedded information extraction-encryption means 13, and transmitting the first transmission information (first information) to the detection center 20; authentication means 18 for receiving the second transmission information (second information) and the authentication key from the detection center 20, and authenticating the second transmission information by using the authentication key, the generation key, and the authentication information outputted from the authentication information generation means 14; embedded information extraction means 17 for extracting the embedded information from the second transmission information and the generation key; and authentication and embedded information extraction result display means 19 for displaying an authentication result outputted from the authentication means 18 and the embedded information extraction result outputted from the embedded information extraction means 17.

First of all, respective means included in the user terminal 10 will now be described.

The image input means 11 is means for inputting an image which becomes the subject of digital watermark detection. This is implemented by, for example, a device for reading an image from a medium such as a CD-ROM and a scanner for reading an image from a printed matter. As for the format of image data output from the image input means 11, a general purpose format such as, for example, BMP (Windows Bitmap) is used.

The feature quantity extraction means 12 is means for calculating a feature quantity from an image. It is now assumed that the model of the Reference 1 is applied to the digital watermark scheme of the present invention. In other words, it is now assumed that the feature quantity of an image S output from the feature quantity extraction means 12 is f(S) in the (Equation 1) and f(S) is a real number vector having a length m. As examples of f(S), data or a part of data subjected to signal transform such as DCT or Fourier transform, and various statistics such as the moment of the image can be used.

The embedded information extraction and encryption means 13 conducts extraction of embedded information from the feature quantity and encryption of extracted embedded information by using an extraction and encryption key. The modulation matrix and the demodulation matrix are W' and W in the (Equation 1), respectively. The length of the embedded information V in the (Equation 1) is supposed to be n. Each of bits of V is −1 or 1. W is an n×m matrix, and column vectors are orthogonal. Extraction of the embedded information is conducted by quantizing W×f(S) by using the quantization function q( ) indicated by the (Equation 2). Hereafter, however, both W×f(S) and q(W×f(S)) are referred to as embedded information without making no distinction between them. Furthermore, an (i, j) component of the matrix W is represented by w(i, j). Here, the extraction and encryption key is obtained by encrypting the demodulation matrix W component after component. Assuming that a cryptogram for a plaintext X is E(X), the extraction and encryption key becomes a matrix EW having E(w(i, j)) as its (i, j) component. E(w(i, j)) is represented by ew((i, j).

However, it is now assumed that the cryptograph E( ) used in the present invention satisfies the following conditions.

Condition 1.

The product of two cryptograms E(X) and E(Y) becomes a cryptogram E(X+Y) of the sum of their respective plaintexts.

Condition 2.

The encryption function has a random number parameter as an argument. As to a single plaintext, different cryptograms exist depending upon the random number parameter.

A cryptograph satisfying the condition 1 is called cryptograph having homomorphism. As an example of a cryptograph satisfying the above described two conditions, there is a cryptograph described in Reference 2 by Okamoto et al., "A new public-key cryptosystem as secure as factoring, EuroCrypt '98, Lecture notes in computer science 1403, 1998. In a cryptograph satisfying the above described two conditions, the encryption key and the random number parameter are also arguments of the encryption function E( ). However, description of them will be omitted.

In processing of the embedded information extraction and encryption means 13, there is conducted such processing that a user cannot directly recognize the embedded information. To be concrete, letting the feature quantity be f(S)=(t1, t2, . . . , tm), encrypted embedded information G output by the embedded information extraction and encryption means 13 is represented by the following Equation.

{Encrypted embedded information}$G=(g1, g2, \ldots, gn)$, $gi=(ew(i, 1)^{t1}) \times (ew(i, 2)^{t2}) \times \ldots \times (ew(i, m)^{tm})$, where $a^b$ represents the $b$th power of $a$. (Equation 3)

By the following (Equation 4), it is shown that G is a vector obtained by encrypting W×f(S) element after element.

$$gi=(ew(i, 1)^{t1}) \times (ew(i, 2)^{t2}) \times \ldots \times (ew(i, m)^{tm}) = E(w(i, 1) \times t1) \times E(w(i, 2) \times t2) \times \ldots \times E(w(i, m) \times tm) =$$
$$E(w(i, 1) \times t1 + w(i, 2) \times t2 + \ldots + w(i, m) \times tm) \quad \text{(Equation 4)}$$

The authentication information generation means 14 is implemented by a random number generator and a function of generating an initial parameter to be supplied to the random number generator. For example, it is possible to use a known hash function such as SHA (Secure hash algorithm) as the random number generator, and use a character input from a keyboard, a process ID of a program, or the like as an initial parameter.

The authentication information encryption means 15 generates encrypted authentication information H from an extraction and encryption key EW and authentication information Z. Assuming that authentication information is Z=(z1, z2, . . . , zn), encrypted authentication information H is given by the following (Equation 5).

{Encrypted authentication information}$H=(h1, h2, \ldots, hn)$, $hi=(ew(i, 1)^{zi}) \times (ew(i, 2)^{zi}) \times \ldots \times (ew(i, m)^{zi})$ (Equation 5)

By the following (Equation 6), it is shown that hi is a cryptogram having (ith row sum of W×zi) as a plaintext.

$$hi=(ew(i, 1)^{zi}) \times (ew(i, 2)^{zi}) \times \ldots \times (ew(i, m)^{zi})$$
$$=E(w(i, 1)zi) \times E(w(i, 2)zi) \times \ldots \times E(w(i, m) \times zm)$$
$$=E((w(i, 1)+w(i, 2)+ \ldots +w(i, m)) \times zi) \quad \text{(Equation 6)}$$

The first transmission information generation means 16 generates first transmission information from the encrypted authentication information H and the encrypted embedded information G. Furthermore, the first transmission information generation means 16 outputs information concerning generation of the first transmission information as a generation key. Here, the first transmission information is a vector having a length of 2n obtained by concatenating the encrypted embedded information G and the encrypted authentication information H at random. The term "concatenating at random" means concatenating G and H and thereafter rearranging components of a concatenated vector in a random order. As for a method of rearrangement, there are 2n factorial ways. The generation key is information indicating which rearrangement has been conducted among 2n factorial ways of rearrangement.

The embedded information extraction means 17 extracts embedded information from second transmission information by using the generation key. Here, the second transmission information is a vector having a length of 2n obtained by decoding respective components of the first transmission information and conducting quantization represented by (Equation 2). The embedded information extraction means 17 specifies a partial vector obtained by decoding and quantizing the encrypted embedded information, and converts this partial vector to embedded information. Obtained embedded information is treated as a result of embedded information extraction. The embedded information extraction result is not limited to the extracted embedded information itself. For example, in the case where embedded information has been subjected to error correction coding, it is conceivable that the embedded information extraction means 17 conducts error correction decoding as well, and returns a result of the error correction decoding as the embedded information extraction result.

The authentication means 18 conducts authentication of the second transmission information (second information) by using the generation key, an authentication key K, and authentication information Z, and outputs an authentication result. Here, the authentication result is binary information indicating whether the detection center section 20 has given an illegal answer. Here, the authentication key K is information indicating whether the sum of rows of W is positive or negative, and the authentication key K is given by (Equation 7).

$$\{\text{Authentication key}\} K=(k1, k2, \ldots, kn) \quad \text{(Equation 7)}$$

$k_i=1$ if $(w(i, 1)+ \ldots +w(i, m))$ is positive
$k_i=-1$ if $(w(i, 1)+ \ldots +w(i, m))$ is negative As indicated by the (Equation 7), the authentication key K is determined uniquely from W.

The authentication means 18 specifies a partial vector $A=(a1, a2, \ldots, an)$ subjected to decoding of encrypted authentication information H and quantization from the second transmission information by using the generation key, and ascertains whether a set of (Z, K) and A are not contradictory to each other. If the center conducts correct processing, it follows from (Equation 6) that $a_i=q((w(i, 1)+ \ldots +w(i, m))\times z_i)$, and consequently the sign of $z_i \times k_i$ coincides with the sign of $a_i$ for $i=1, 2, \ldots, n$. In the case where the sign of $z_i \times k_i$ coincides with the sign of $a_i$ for $i=1, 2, \ldots, n$, the authentication means 18 recognizes that the center has given a legal answer. Otherwise, the authentication means 18 recognizes that the center has given an illegal answer.

As represented by the (Equation 6), encrypted authentication information H is not a cryptogram of the authentication information Z itself, but a cryptogram of a plaintext determined by the authentication key K which is uniquely determined by W determined by the center and authentication information Z determined by the user arbitrarily.

If the center does not transmit a legal value (a value obtained by decoding H and quantizing the decoded H) for a portion corresponding to H, when the center transmits second transmission information to the user, then the user is aware that the center has not returned a legal value because the user knows Z and K. If the center can know which portion of the first transmission information corresponds to H, then the center can make an illegal answer successful so that the user will not become aware thereof. In other words, it is possible to transmit an illegal value only for a portion corresponding to encrypted embedded information and transmit a legal value for a portion corresponding to H. Since the center does not know the generation key, however, the center cannot know which portion corresponds to H.

The authentication and embedded information extraction result display means 19 is supplied with the embedded information extraction result and the authentication result, and displays them on a display device such as a monitor. It is also possible to conduct display with a printed matter by using a printing device such as a printer instead of the display device.

The image input means 11 and other means except the authentication and embedded information extraction result display means 19 can be implemented by using a central processor unit and a digital signal processor.

Means forming the detection center section 20 will now be described.

The demodulation matrix generation means 21 for generating a demodulation matrix required to extract the embedded information generates the demodulation matrix W. W corresponds to the modulation matrix used for embedding. The modulation matrix and the demodulation matrix must satisfy the relation of the (Equation 1) (i.e., such a relation that the product of them becomes a unit matrix).

By using W, the extraction and encryption key generation means 22 outputs the extraction and encryption key EW obtained by encrypting W component after component by using the encryption key of the cryptograph E( ). The random number parameter which is the argument of E( ) is obtained by using a suitable random number generator.

The second transmission information generation means 23 decodes the first transmission information component after component by using a decoding key of the cryptograph E( ), and quantizes a result of decoding in accordance with the (Equation 2). The second transmission information generation means 23 outputs a result of quantization as the second transmission information (second information).

The authentication key generation means 24 generates and outputs the authentication key K by using the demodulation matrix W. As described earlier, the authentication key K is uniquely determined depending upon W.

Respective means of the detection center section 20 can be implemented by using the central processor unit. Furthermore, communication processing in the user terminal section 10 and the detection center section 20 are implemented by using a computer network capable of transmitting and receiving digital data. Internet is mentioned as its example.

In the first embodiment of the present invention heretofore described, the cryptograph E( ) can be applied to both the common key cryptograph and the public key cryptograph.

A second embodiment of the present invention, which can be considered in the case where E( ) is the public key cryptograph in the same way as the cryptograph of Reference 2, will hereafter be described.

In the second embodiment, information about the demodulation matrix W known by the user is less than that of the first embodiment. Therefore, it is considered that the user is more secure against an attack for transmitting illegal data and knowing W.

Figure 2:
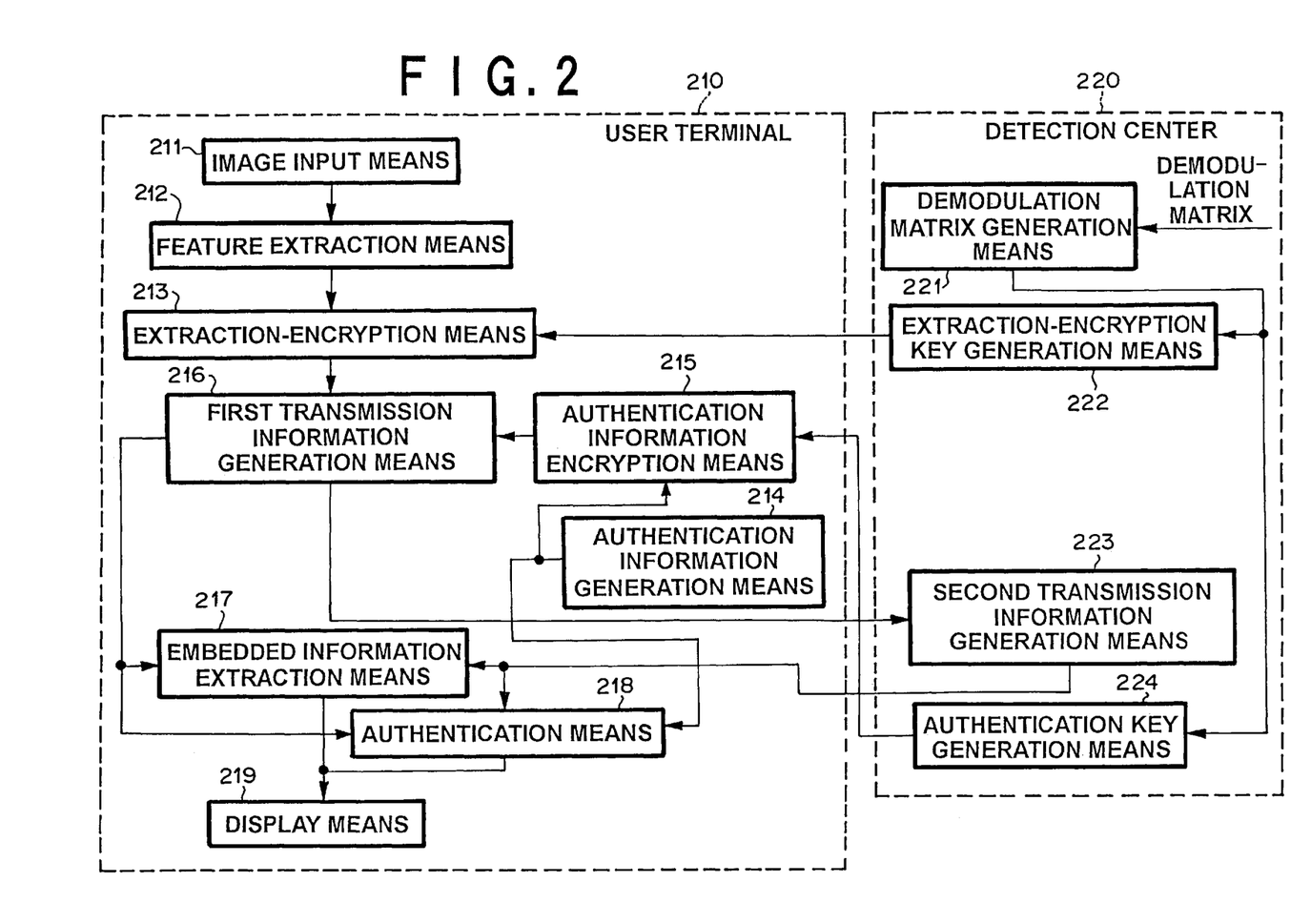
FIG. 2 is a block diagram showing a second embodiment of the present invention.

The second embodiment of the present invention differs from the first embodiment in operation of authentication information encryption means 215 and authentication means 218 as for the user terminal section and operation of extraction and encryption key generation means 222 and authentication generation means 224 as for the detection center section.

As for operation of other means, means having the same names as those of the first embodiment conduct like operation.

FIG. 2 is a block diagram showing the second embodiment of the digital watermark detection system according to the present invention.

First of all, the authentication information encryption means 215 and the authentication means 218 of the user terminal 210 will now be described.

By using an authentication key K', the authentication information encryption means 215 generates encrypted authentication information H' from the authentication information Z.

Unlike the first embodiment, H' is the cryptogram itself of the authentication information Z.

Assuming now that the authentication information is $Z=(z1, z2, \ldots, zn)$, therefore, the encrypted authentication information H' is $H'=(E(z1), E(z2), \ldots, E(zn))$.

Furthermore, the authentication key K' is an encryption key of the cryptograph E( ).

The authentication means 218 conducts authentication of the second transmission information by using the generation key and the authentication information Z, and outputs an authentication result. Here, the authentication result is binary information indicating whether the detection center section 220 has given an illegal answer.

The authentication means 218 specifies a partial vector $A=(a1, a2, \ldots, an)$ subjected to decoding of encrypted authentication information H' and quantization from the second transmission information (second information) by using the generation key, and ascertains whether the sign of zi coincides with the sign of ai for $i=1, 2, \ldots, n$. In the case where the sign of zi coincides with the sign of ai for $i=1, 2, \ldots n$, the authentication means 218 recognizes that the center has given a legal answer. Otherwise, the authentication means 218 recognizes that the center has given an illegal answer.

If the center does not transmit a legal value (a value obtained by decoding H and quantizing the decoded H) for a portion corresponding to H', when the center transmits second transmission information (second information) to the user, then the user is aware that the center has not returned a legal value because the user knows Z. If the center can know which portion of the first transmission information corresponds to H', then the center can make an illegal answer successful so that the user will not become aware thereof. (It is possible to transmit an illegal value only for a portion corresponding to encrypted embedded information and transmit a legal value for a portion corresponding to H'.) Since the center does not know the generation key, however, the center cannot know which portion corresponds to H'.

The extraction and encryption key generation means 222 and the authentication generation means 224 of the detection center section 20 will now be described.

By using W, the extraction and encryption key generation means 222 outputs the extraction and encryption key EW obtained by encrypting W component after component by using the encryption key of the cryptograph E( ). The random number parameter which is the argument of E( ) is obtained by using a suitable random number generator.

The authentication key generation means 224 generates and outputs the authentication key K' by using the demodulation matrix W. Since the authentication key K' is the encryption key of the cryptograph E( ) as described earlier, how the center generates the authentication key K' depends upon the cryptograph E( ).

Operation of the whole digital watermark detection system in the first embodiment will now be described.

As preparations before conducting watermark detection, the demodulation matrix generation means 21 of the detection center section 20 generates the demodulation matrix W, and supplies W to the extraction and encryption key generation means 22 and the authentication generation means 24. Subsequently, the extraction and encryption key generation means 22 generates the extraction and encryption key EW by using W. The authentication generation means 24 generates the authentication key K by using W. As for EW, a different EW can also be determined according to the random number whenever the user terminal section 10 requests, in the case where the encryption key in the encryption function E( ) is determined depending on the random number as in the cryptograph of Reference 2. K is fixed unless W is altered.

Subsequently, the extraction and encryption key generation means 22 transmits the extraction and encryption key EW to the embedded information extraction and encryption means 13 and the authentication information encryption means 15 of the user terminal section 10. Furthermore, the authentication key generation means 24 transmits the authentication key K to the authentication means 18 of the user terminal section 10. EW and K may be fixed and included beforehand in a program possessed by the user terminal section 10.

Subsequently, a user who operates the user terminal 10 inputs an image from a medium such as a CD-ROM to the image input means 11 of the user terminal section 10. The image input means 11 converts the input image to image data of a form used in the digital watermark detection system, and supplies resultant image data to the feature quantity extraction means 12. The feature quantity extraction means 12 outputs a feature quantity of the image, and supplies it to the embedded information extraction and encryption means 13.

The embedded information extraction and encryption means 13 of the user terminal section 10 derives the encrypted embedded information G from the feature quantity f(S) by using the extraction and encryption key EW, and supplies the encrypted embedded information G to the first transmission information generation means 16. The authentication information generation means 14 generates the authentication information Z, and supplies it to the authentication information encryption means 15.

The authentication information encryption means 15 of the user terminal section 10 derives the encrypted authentication information H from the extraction and encryption key EW and the authentication information Z, and supplies the encrypted authentication information H to the first transmission information generation means 16.

The first transmission information generation means 16 of the user terminal section 10 generates first transmission information from the encrypted authentication information H and the encrypted embedded information G, and transmits the first transmission information to the second transmission information generation means 23 of the detection center section 20. Subsequently, the first transmission information generation means 16 supplies the generation key to the embedded information extraction means 17 and the authentication means 18.

The second transmission information generation means 23 of the detection center section 20 derives the second transmission information from the first transmission information, and transmits the second transmission information to the embedded information extraction means 17 and the authentication means 18 of the user terminal section 10.

The embedded information extraction means 17 of the user terminal section 10 extracts embedded information from the second transmission information by using the generation key, and supplies the embedded information extraction result to the authentication and embedded information extraction result display means 19. Subsequently, the authentication means 18 conducts authentication of the second transmission information by using the generation key, the authentication key K, and the authentication information Z, and outputs a result thereof to the authentication and embedded information extraction result display means 19.

Finally, the authentication and embedded information extraction result display means 19 of the user terminal section 10 displays the embedded information extraction result and the authentication result. If on the basis of the authentication result, the user judges the authentication to have been conducted legally, the user obtains the embedded information from the embedded information extraction result. If the authentication fails, the user judges the detection center section 20 to have returned an illegal answer as to the embedded information extraction result.

Operation of the whole digital watermark detection system in the second embodiment will now be described.

As preparations before conducting watermark detection, the demodulation matrix generation means 221 of the detection center section 220 generates the demodulation matrix W, and supplies W to the extraction and encryption key generation means 222. Subsequently, the extraction and encryption key generation means 222 generates the extraction and encryption key EW by using W. The authentication generation means 224 generates the authentication key K'. As for EW and K', a different EW and a different K' can also be determined according to the random number whenever the user terminal section 210 requests, in the case where the encryption key in the encryption function E( ) is determined depending on the random number as in the cryptograph of Reference 2.

Subsequently, the extraction and encryption key generation means 222 transmits EW to the embedded information extraction and encryption means 213 and the authentication information encryption means 215 of the user terminal section 210. Furthermore, the authentication key generation means 224 transmits the authentication key K' to the authentication means 218 of the user terminal section 210. EW and K' may be fixed and included beforehand in a program possessed by the user terminal section 210.

Hereafter, since image inputting, feature quantity extraction, embedded information extraction and encryption, and generation of the authentication information Z of the user terminal section 210 are the same as the third invention, description thereof will be omitted.

The authentication information encryption means 215 of the user terminal section 210 derives the encrypted authentication information H' from the authentication key K' and the authentication information Z, and supplies the encrypted authentication information H' to the first transmission information generation means 216.

The first transmission information generation means 216 of the user terminal section 210 generates first transmission information from the encrypted authentication information H' and the encrypted embedded information G, and transmits the first transmission information to the second transmission information generation means 223 of the detection center section 220. Subsequently, the first transmission information generation means 216 supplies the generation key to the embedded information extraction means 217 and the authentication means 218.

Hereafter, since generation of the second transmission information conducted by the detection center section 220 and embedded information extraction conducted by the user terminal 210 are the same as those of the first embodiment, description thereof will be omitted.

Subsequently, the authentication means 218 conducts authentication of the second transmission information by using the generation key and the authentication information Z, and outputs a result thereof to the authentication and embedded information extraction result display means 219.

Finally, since display of the embedded information extraction result and the authentication result is the same as that of the first embodiment, description thereof will be omitted.

Figure 3:
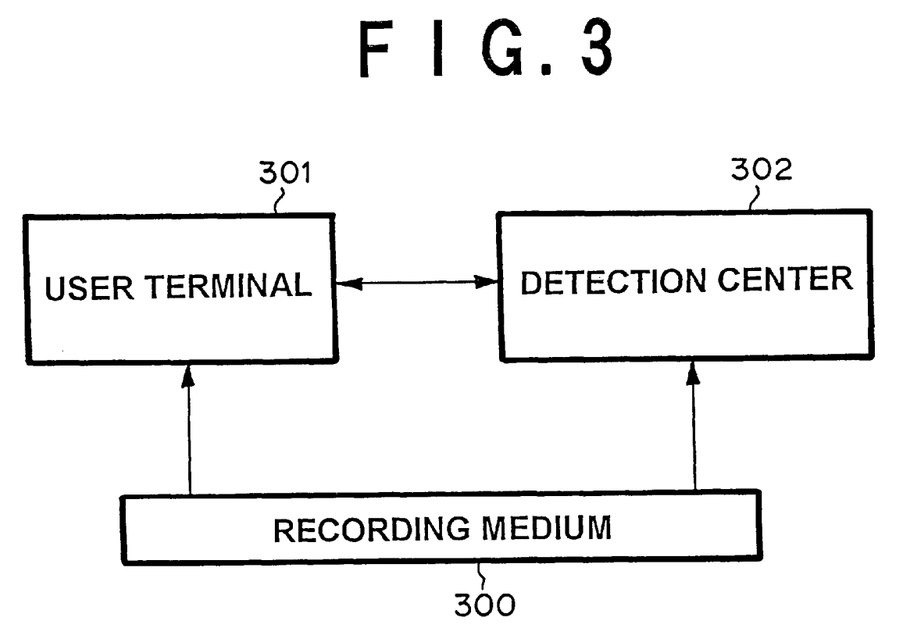
FIG. 3 is a block diagram showing a third embodiment of the present invention.

With reference to FIG. 3, a third embodiment of the present invention has a recording medium 300 which stores a first on-line digital watermark detection program or a second on-line digital watermark detection program. The recording medium 300 may be a magnetic disk, a semiconductor memory, or another recording medium.

The first on-line digital watermark detection program is read from the recording medium 300 into a user terminal 301 and a detection center 302 to control respective operations. Under the control of the first on-line digital watermark detection program, the user terminal 301 executes the subsequent processing, i.e., the same processing as that of the user terminal 10 in the first embodiment. Under the control of the first on-line digital watermark detection program, the detection center 302 executes the same processing as that of the detection center 20 in the first embodiment.

The second on-line digital watermark detection program is read from the recording medium 300 into the user terminal 301 and the detection center 302 to control respective operations. Under the control of the second on-line digital watermark detection program, the user terminal 301 executes the subsequent processing, i.e., the same processing as that of the user terminal 210 in the second embodiment. Under the control of the second on-line digital watermark detection program, the detection center 302 executes the same processing as that of the detection center 220 in the second embodiment.

What is claimed is:

1. An on-line digital watermark detection system which comprises:
   a user terminal for extracting a watermark embedded in images; and
   a detection center connected with said user terminal for generating an extraction key, encryption key and authentication key for said watermark,
   wherein:
   said user terminal outputs toward said detection center a first information which consists of the encrypted watermark and encrypted authentication information which is prescribed;
   said detection center decodes, and quantizes said first information, and outputs toward said user terminal a second information namely the quantized first information; and
   said user terminal authenticates said second information and extracts said watermark from said second information; and wherein said detection center comprises;
   demodulation matrix generation means for generating a demodulation matrix required to extract said watermark;
   extraction and encryption key generation means for transmitting an extraction key and encryption key required to extract and encrypt said watermark to said user terminal;
   second information generation means for decoding and quantizing a first information containing the encrypted watermark and the encrypted authentication information transmitted by said user terminal, and for transmitting the quantized first information to said user terminal as a second information.

2. The on-line digital watermark detection system according to claim 1, wherein said user terminal encrypts said watermark and authentication information on the basis of said encryption key.

3. The on-line digital watermark detection system according to claim 1, wherein:
   said first information is a random combination of encrypted watermark and encrypted authentication information;
   said user terminal keeps a generation key which describes said random combination, and extracts by using said generation key said watermark and said authentication information from said second information.

4. The on-line digital watermark detection system according to claim 1, wherein said user terminal ascertains normality of said authentication information by using said authentication key, when said user terminal receives said second information.

5. An on-line digital watermark detection system which comprises:
   a user terminal for extracting a watermark embedded in images; and
   a detection center connected with said user terminal for generating an extraction key, encryption key and authentication key for said watermark,
   wherein:
      said detection center comprises;
         demodulation matrix generation means for generating a demodulation matrix required to extract said watermark,
         extraction and encryption key generation means for transmitting an extraction key and encryption key required to extract and encrypt said watermark to said user terminal,
         second information generation means for decoding and quantizing a first information containing the encrypted watermark and the encrypted authentication information transmitted by said user terminal, and for transmitting the quantized first information to said user terminal as a second information, and
         authentication key generation means for transmitting an authentication key to said user terminal, and
      said user terminal comprises;
         image input means for inputting an image,
         feature quantity extraction means for calculating a feature quantity from said image,
         watermark extraction and encryption means for extracting said watermark from said feature quantity and encrypting said watermark by using said extraction key and encryption key, respectively, transmitted by said detection center,
         authentication information generation means for generating authentication information required to authenticate said second information,
         authentication information encryption means for encrypting said authentication information by using said encryption key,
         first information generation means for generating said first information and a generation key which describes a procedure for generating said first information, and for transmitting said first information to said detection center,
         authentication means for receiving said second information and said authentication key from said detection center, and authenticating said second information by using said authentication key and said generation key,
         watermark extraction means for extracting said watermark from said second information by using said generation key; and
         display means for displaying an authentication result outputted from said authentication means and said watermark extraction result output from said watermark extraction means.

6. An on-line digital watermark detection system according to claim 5, wherein:
   said first information is a random combination of encrypted watermark and encrypted authentication information;
   said user terminal keeps a generation key which describes said procedure for generating said random combination and extracts by using said generation key said watermark and authentication information from said second information.

7. The on-line digital watermark detection system according to claim 5, wherein said user terminal ascertains normality of said authentication information by using said authentication key, when said user terminal receives said second information.

8. An on-line digital watermark detection system which comprises:
   a user terminal for extracting a watermark embedded in images; and
   a detection center connected with said user terminal for generating an extraction key, encryption key and authentication key for said watermark,
   wherein:
      said detection center comprises;
         demodulation matrix generation means for generating a demodulation matrix required to extract watermark,
         extraction and encryption key generation means for transmitting said extraction key and encryption key required to extract and encrypt said watermark to said user terminal,
         second information generation means for decoding and quantizing a first information consisting of the encrypted watermark and the encrypted authentication information which is prescribed transmitted by said user terminal, and for transmitting the quantized first information to said user terminal as second information, and
      authentication key generation means for transmitting an authentication key to said user terminal, and
      said user terminal comprises;
         image input means for inputting an image,
         feature quantity extraction means for calculating a feature quantity from said image, watermark extraction and encryption means for extracting watermark from said feature quantity and encrypting said watermark by using said extraction and encryption key, respectively, transmitted by said detection center device, authentication information generation means for generating authentication information required to authenticate said second information, authentication information encryption means for encrypting said authentication information by using said encryption key;

first information generation means for generating said first information and a generation key which describes a procedure for generating said first information, and for transmitting said first information to said detection center, authentication means for receiving said second information from said detection center, and authenticating said second information by using said authentication key and said generation, watermark extraction means for extracting said watermark from said second information by using said generation key, and display means for displaying an authentication result output from said authentication means and said watermark extraction result output from said watermark extraction means.

9. An on-line digital watermark detection system according to claim 8, wherein:

said first information is a random combination of encrypted watermark and encrypted authentication information;

said user terminal keeps a generation key which describes said procedure for generating said random combination, and extracts by using said generation key said watermark and authentication information from said second information.

10. The on-line digital watermark detection system according to claim 8, wherein said user terminal ascertains normality of said authentication information by using said authentication key, when said user terminal receives said second information.

11. An on-line digital watermark detection method which uses a user terminal for extracting a watermark embedded in images and a detection center connected with said user terminal for generating an extraction key, encryption key and authentication key for said watermark, which comprises the steps of:

outputting from said user terminal toward said detection center a first information which consists of encrypted watermark extracted from said images and an encrypted authentication information which is prescribed;

decoding and quantizing at said detection center said first information, and outputting toward said user terminal a second information namely the quantized first information receiving said second information and said authentication key from said detection center; and authenticating at said user terminal said second information by using said authentication key and said generation key, and extracting said watermark from said second information;

generating a demodulation matrix required to extract said watermark; and transmitting an extraction key and encryption key required to extract and encrypt said watermark to said user terminal.

12. The on-line digital watermark detection method according to claim 11, wherein said user terminal encrypts said watermark and said authentication information by using said encryption key.

13. An on-line digital watermark detection method according to claim 11, wherein:

said first information is a random combination of the encrypted watermark and the encrypted authentication information;

said user terminal keeps a generation key which describes a procedure for generating said random combination, and extracts by using said generation key said watermark and authentication information from said second information.

14. The on-line digital watermark detection method according to claim 11, wherein said user terminal ascertains normality of said authentication Information by using said authentication key and said generation key, when said user terminal receives said second information.

15. A computer program product for detecting a watermark by using a user terminal for extracting a watermark embedded in images and a detection center connected with said user terminal for generating an extraction key, encryption key and authentication key for said watermark, which describes the procedures of executing watermark detection, said procedures including:

procedures executed by said detection center which includes the steps of;

generating a demodulation matrix required to extract said watermark, transmitting said extraction key and encryption key required to extract and encrypt said watermark to said user terminal, decoding, quantizing first information consisting of the encrypted watermark and encrypted authentication information transmitted by said user terminal, and transmitting the quantized first information to said user terminal as second information, and transmitting said authentication key to said user terminal, and procedures executed by said user terminal which includes the steps of;

inputting an image, calculating a feature quantity from said image, extracting said watermark from said feature quantity and encrypting said watermark by using said extraction key and encryption key, respectively, transmitted by said detection center, generating authentication information required to authenticate said second information, encrypting said authentication information by using said encryption key, generating said first information and a generation key which describes a procedure for generating said first, and transmitting said first information to said detection center, receiving said second information and said authentication key from said detection center, and authenticating said second information by using said authentication key and said generation key, extracting said watermark from said second information by using said generation key; and displaying an authentication result said watermark.

16. A computer program product for detecting a watermark by using a user terminal for extracting a watermark embedded in images and a detection center connected with said user terminal for generating an extraction key, encryption key and authentication key for said watermark, which describes the procedures of executing watermark detection, said procedures including:

procedures executed by said detection center which includes the steps of;

generating a demodulation matrix required to extract watermark,         transmitting said extraction key and encryption key required to extract and encrypt said watermark to a user terminal,         decoding, quantizing said first information consisting of the encrypted watermark and encrypted authentication information transmitted by said user terminal, and transmitting the quantized first information to said user terminal as second information, and         transmitting an authentication key to said user terminal, and     procedures executed by said user terminal which includes the steps of;

inputting an image, calculating a feature quantity from said image,         extracting watermark from said feature quantity and encrypting said watermark by using said extraction key and encryption key, respectively, transmitted by said detection center,         generating authentication information required to authenticate said second information,         encrypting said authentication information by using said encryption key;

first information generation means for generating said first information and a generation key which describes a procedure for generating said first, and transmitting said first information to said detection center,     receiving said second information from said detection center, and authenticating said second information by using said authentication key and said generation,     extracting said watermark from said second information by using said generation key, and     displaying an authentication result and said watermark.

\* \* \* \* \*